Aug. 15, 1967  C. D. GROVER  3,335,600
APPARATUS FOR DETERMINING CAMERA SHUTTER SPEED
Filed Oct. 2, 1964  2 Sheets-Sheet 1

INVENTOR
Clayton D. Grover
BY
TOWNSHEND & MESEROLE
ATTORNEYS

Aug. 15, 1967   C. D. GROVER   3,335,600
APPARATUS FOR DETERMINING CAMERA SHUTTER SPEED
Filed Oct. 2, 1964

United States Patent Office 3,335,600
Patented Aug. 15, 1967

3,335,600
APPARATUS FOR DETERMINING CAMERA
SHUTTER SPEED
Clayton D. Grover, 392 Lawn Ridge Road, Orange, N.J.
07050; Laury Farrand Grover, executrix of said Clayton
D. Grover, deceased
Filed Oct. 2, 1964, Ser. No. 401,180
4 Claims. (Cl. 73—5)

This invention relates to the art of measuring and testing devices, and particularly to measurement of camera shutter speed.

Professional photographers, particularly those of the press operating in the field, and amateur camera enthusiasts often experience a need to know the current operating shutter speed of their cameras. Shutter operation is susceptible to variation from rated speed under the influence of local atmospheric and temperature conditions and length of service. Adequate apparatus for testing is rarely available when need arises. Such apparatus in general is complex, cumbersome, and expensive. Moreover, it is difficult to transport and is not usually portable.

The present invention is a simple, inexpensive apparatus that is easily portable as a kit of light weight and few parts capable of quick assembly to indicate photographically the current operating suhtter speed of a camera with which it may be used.

Additionally, the invention comprises novel means for registering and photographically recording the movement of an indicator relative to a fixed scale during the exposure interval of a camera shutter, whereby the current operating speed of the shutter over that interval may be ascertained by simple calculation based on examination of the photographic record.

Other and incidental objects will be apparent from the following description taken in connection with the accompanying drawings, in which.

The apparatus of the present invention comprises broadly the combination of a photographic background member provided with scale indicia, an indicator movable relative to the scale in photographic contrast thereto, power means for moving the indicator at a predetermined speed, and a camera to photograph the indicator during its movement relative to the scale. It is to be understood that the various embodiments of the invention as herein disclosed are for illustration and are not restrictive.

Figure 1:
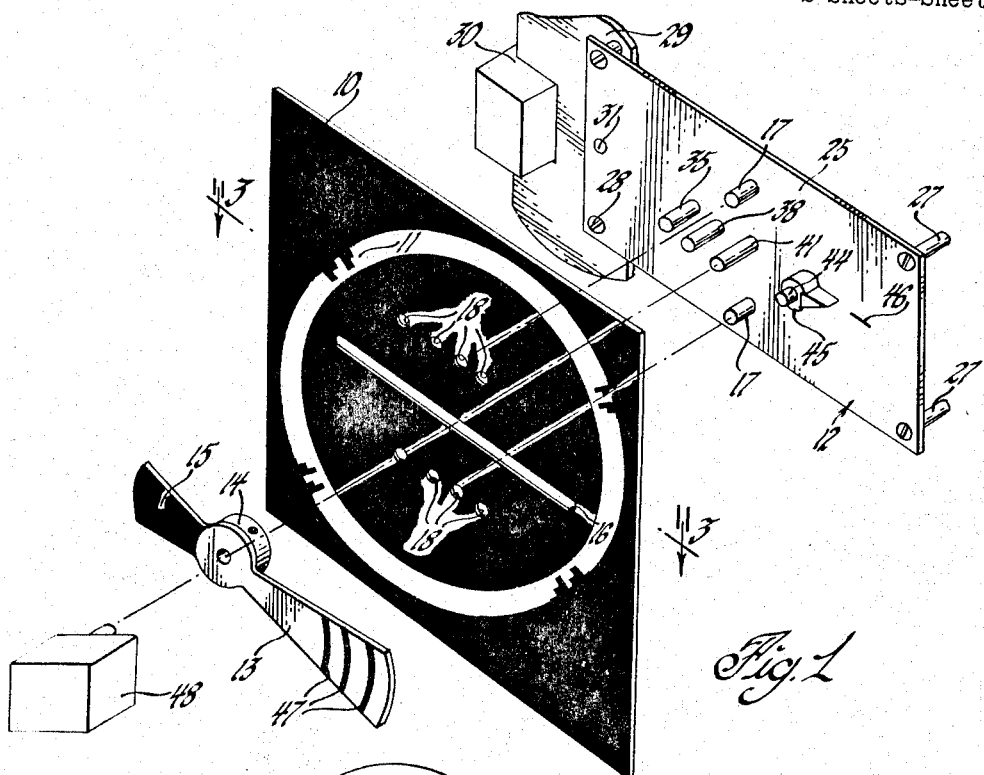
FIG. 1 is an exploded perspective view of apparatus comprising an embodiment of the invention.
Figure 2:
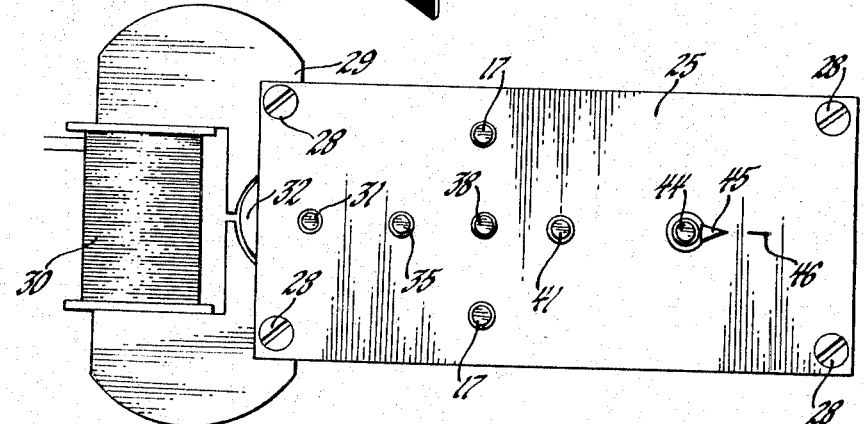
FIG. 2 is an elevation of a power unit comprising a part of the invention.
Figure 3:
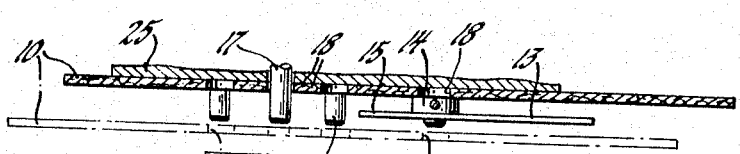
FIG. 3 is a sectional view taken substantially on the line 3—3 of FIG. 1 as assembled, with selective positions of certain elements indicated in phantom.

The embodiment shown in FIGS. 1–3 comprises a photographic background member 10, such as a sheet of cardboard or the like, provided on its obverse face with indicia in the form of a circle scale 11 and which is adapted for mounting in fixed, stationary relation on the front of a power unit indicated generally at 12. An indicator 13, here shown shaped as a sector of a circle with a hub 14 and a counterbalance 15, is connectible through a diametrically disposed closed end slot 16 in member 10 with a selected one of a plurality of driven rotatable shafts, later described, constituting elements of the power unit 12, by which the indicator sector is caused to revolve over the scale 11 at the r.p.m. of the shaft to which it is detachably and rigidly fastened by its hub 14. Two or more anchoring pins 17 fixed on the front plate of the power unit extend laterally forward thereof for engagement through appropriate ones of a series of complemental holes 18 provided through the background member 10, whereby that member is centered relative to the selected power unit shaft and is anchored in stationary, fixed position on the unit. The holes 18 are in two sets of equal number, one above and one below the slot 16 and parallel thereto.

In the herein disclosed embodiment of the invention the power unit 12 is preferably substantially of the construction shown in my copending application Ser. No. 395,267, filed Sept. 9, 1964 entitled Power Distribution Unit, now abandoned. It comprises an open frame having a front wall plate 25 and a parallel rear wall 26 connected by spacers 27 at the four corners thereof and to which the walls are secured by attaching elements 28. A simple shaded pole electric motor 29 operative by house current or batteries is mounted on the upper and lower spacers between the walls at one end of the frame, with the bulk of the motor and its field coil 30 projecting longitudinally outward beyond the frame end. The motor is not a constant speed motor, but is of the type commonly used for turntables, rotisseries, and the like. The shaft 31 of the motor armature 32 is journaled at its ends in the frame walls intermediate and in alignment with the adjacent pair of spacers 27.

Fixed to the armature shaft for rotation therewith is a driving pinion 33 meshed with a driven gear wheel 34 fixedly attached to a spindle shaft 35 spaced inwardly from the armature shaft 31 and parallel thereto in the transverse longitudinal median plane of the frame. The spindle shaft is journaled for rotation in the frame walls, and the ends of the shaft pass through the walls and extend appreciably outwardly thereof.

The spindle shaft 35 has fixed thereon a pinion 36 meshed with a gear wheel 37 fixedly attached on a second spindle shaft 38. A pinion 39 fixedly attached on the shaft 38 is meshed with a gear wheel 40 that is fixedly attached on a third spindle shaft 41. This spindle has fixedly attached thereon a pinion 42 meshed with a gear wheel 43 fixedly attached on a fourth spindle shaft 44.

All the spindle shafts and the motor armature shaft lie in a common plane, but may be otherwise arranged as desired. Also, the location of the motor and its manner of attachment in the frame may be other than as shown. The gear wheel 43 is of greater diameter than any of the others and is farthest removed from the motor 29 by which it and its spindle 44 are driven through the train comprising the pinions and gears of the intermediate spindles 35, 38 and 41. Gear wheel 43 is a monitor by which the r.p.m. of any selected one of the spindles or of the motor armature may be ascertained without recourse to instruments. Its ratio to the driving pinion 33 of the motor is such that, within the r.p.m. range of the motor, its spindle 44 will never rotate at an r.p.m. that cannot easily be counted by timing with an ordinary watch. In order to enable such timing the monitor spindle 44 carries an indicator arm or pointer 45 fixedly attached on its front projecting end for cycling revolution past a fixed mark of reference 46 on the outer face of the front wall 25. Thus, simply by counting the number of times per minute the pointer 45 passes the reference mark 46, the current operating r.p.m. of the monitor spindle 44 will be ascertained.

Each intermediate spindle rotates at an r.p.m. different from the individual r.p.m. of each of the other spindles, much greater than the monitor spindle 44 and reduced relative to the armature shaft 31 and its driving pinion 33. Each intermediate spindle operating gear wheel has a predetermined ratio to the monitor spindle gear wheel 43, which ratio is different from the ratio of any other spindle gear wheel, is known, and constitutes a factor used in calculating the current r.p.m. of the motor or of any one of the spindles selected to operate the indicator 13.

The apparatus is assembled by moving the background member 10 laterally inward against the front wall 25 of the power unit, whereby to dispose the spindles 35, 38, 41 and 44 through the slot 16 with the anchoring pins 17 passed through those ones of the guide holes 18 that will center the circle scale 11 on the axis of whichever one of the spindles is selected for use. The hub 14 of the indicator is then attached to the end of the selected spindle for rotation therewith. The assembly thus formed constitutes in its entirety a register which registers visually the movement of revolution of the indicator 13 relative to the fixed scale 11 when the motor 29 is energized to effect rotation of the power unit spindles.

The arcuate outer end of the sector 13 is curved on the radius of a circle whereof the perimeter delineates the inner ends of the radial scale lines which, in this example, divide the scale into seventy-two portions each comprising an arcuate extent of five degrees. The individual portions are staggered in length as shown in order to facilitate reading. This arrangement is convenient, but arbitrary, and the scale indicia may be otherwise than as shown so long as its divisions indicate individual or multiple degrees totalling three hundred and sixty. Inasmuch as the invention contemplates the selective use of indicator sectors of different arcuate widths, photographically contrasting bands 47 or other suitable indicia on the indicator are used to identify the various widths and to assist in defining on a photographic record the extent of movement of the indicator.

Figure 4:
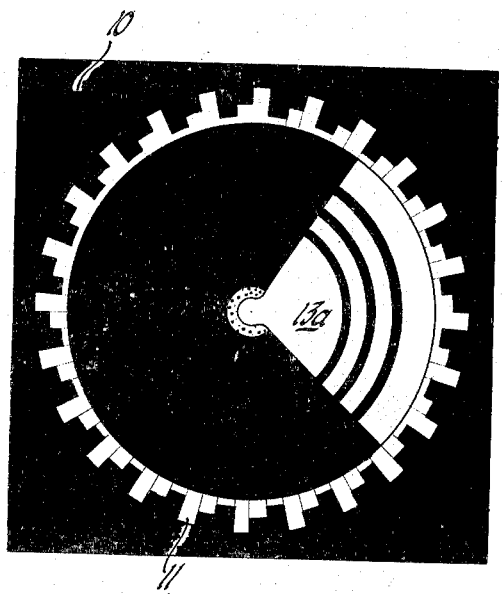
FIG. 4 is a representation of a photographic record obtained from the apparatus of FIG. 1.
Figure 5:
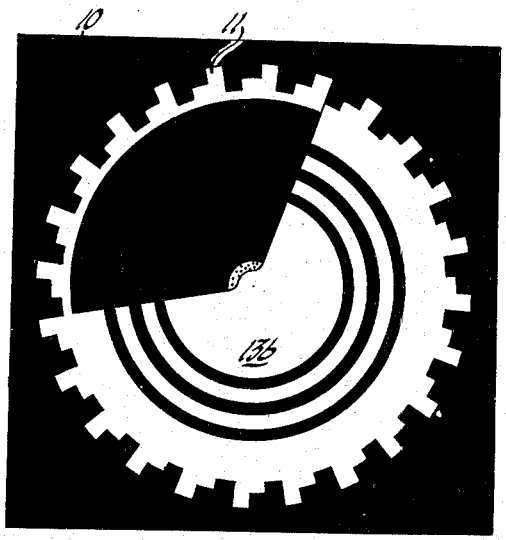
FIG. 5 is a representation similar to FIG. 4, but of a different record.

A camera 48, in which the current speed of its shutter is to be ascertained, is positioned in front of the assembled register and operated to snap a picture of the indicator revolving over the background 10 relative to the scale 11. When the exposed film is developed and printed the print is a photograph that constitutes a visual record of the extent to which the indicator moved along the scale in the length of time the film was exposed by operation of the camera shutter. The extent of the indicator movement is recorded in the photograph as a blur. FIGS. 4 and 5 represent separate pictures taken at different shutter speeds, in which the blur of the moving indicator is indicated as 13a in the faster (FIG. 4), and as 13b in the slower (FIG. 5).

*Operation*

From the above description it is apparent that the r.p.m. of whichever of the power unit spindles is selected for use is translated into degrees by the register illustrated in FIGS. 1–3. As the motor 29 is not a constant speed motor, and because operation of the power unit varies under the influence of current local conditions of atmosphere and temperature, it is desirable that the spindle selected be one that operates at an r.p.m. best suited for optimum register performance with reference to the rated set speed of a camera shutter to be tested. The speed of the moving indicator should be faster than the rated shutter speed as set, but not excessively so. This desideratum requires that the current operating r.p.m. of the selected spindle be known prior to the step of recording on the camera film the extent to which the indicator moved with reference to its associated scale during the time the film was exposed by operation of the camera shutter.

Consequently, the first step in using the apparatus is ascertainment of the current r.p.m. of the power unit spindles. This is accomplished easily and before mounting the background simply by placing the power unit in operation and counting with the aid of an ordinary watch the number of times per minute that the pointer 45 cycles past the stationary, fixed reference mark 46 on the front face plate of the power unit. The counted cycles per minute is the actual r.p.m. of the monitor gear wheel 43. This, multiplied by the factor of the known ratio between the gear wheel of a selected spindle and the monitor gear wheel 43 gives the actual current operating r.p.m. of the selected spindle.

For example, let it be assumed that the ratio of the monitor gear wheel 43 to spindle gear wheel 34 is such that one full revolution of the gear wheel 43 and its spindle 44, which registers as one cycle of the pointer 45 past the mark 46, represents sixty revolutions of gear wheel 34. The ratio factor is sixty. Thus, if the cycle count of the pointer is sixty per minute, it will be known that the gear wheel 34 and its spindle 35 then are operating at 3600 r.p.m.

This same formula applies in like manner to ascertainment of the current operating r.p.m. of each of the other spindles 38 and 41. The ratio of each of their respective gear wheels to the monitor gear wheel 43 is known, so that the r.p.m. of any intermediate spindle may be ascertained by multiplying the counted cycles per minute of pointer 45 by the ratio factor of the gear wheel of that particular spindle.

The next step after spindle selection is assembly of the register by mounting the scaled background member and the indicator on the power unit in the manner hereinbefore described. The assembled register and the camera are then positioned in appropriate juxtaposition, the power unit is put in operation, and a picture is taken of the register indicator moving over the background member in relation to its scale. When the film is developed and printed the photograph is a visual record, which can be examined at leisure, of the scale extent to which the indicator moved in the time the film was exposed by operation of the shutter.

In the example given the actual speed at which the camera shutter operated may be calculated from the photograph by application of the following equation:

$$\frac{1}{R \div (D-W)} = S$$

where R is the rate of rotation of the selected spindle in degrees per second; D is the arcuate width of the indicator blur in degrees; W is the arcuate width of the sector-shaped indicator in degrees; and S is the shutter speed in fractions of a second. The degrees per second R of the spindle 35 that was used is found by multiplying the counted r.p.m. of the monitor spindle 44 by six times the factor of the ratio between the spindle gear wheel 34 and the monitor gear wheel 43. The product gives the r.p.m. expressed in degrees per second of the spindle 35 that was used to revolve the indicator 13.

Again it is explained that the register assembly herein shown and described is illustrative and not restrictive. Many variations of the illustrated structures are possible, as will be understood by those skilled in the art. For instance, the background member shown in FIGS. 1–3 could have a single central opening instead of the diametrical slot 16; or a series of separate holes could be used instead of a slot; or a separate background might be provided for each spindle. Whatever type of background is used, the essential requirement is that its scale be in the form of a circle that is centered on the axis of the selected power unit spindle when in use. Also, the particular power unit shown herein could be replaced by any power device operative to effect revolution or rotation of the indicator at a known r.p.m.

In its broad aspects the present invention is a means for recording photographically the extent of relative movement at a predetermined rate of speed between an indicator and an associated scale during an interval of time prescribed by the recording means.

I claim:
1. Apparatus for measuring the shutter speed of a camera comprising: a frame including a flat front wall; a gear train mounted in the frame and including a plurality of spindles extending through and laterally outward from said wall in parallel, spaced relation; said gear train being operative to rotate the spindles simultaneously at different individual speeds; a shaded pole electric motor carried in said frame in operative connection with the gear train for rotating the spindles; the axes of said spindles occupying a plane common to all; a photographic flat background member having on its obverse face indicia in the form of a circle scale and provided further with a slot extending diametrically within the scale circle, the slot being of a width to accommodate passage of said spindles therethrough; said background member seated over the spindles in parallel relation to the wall of said frame and with a selected one of the spindles centered on the axis of said circle scale; a pair of spaced apart fixed pins extending laterally from the front wall of the frame parallel to the spindles; said background member having therein a pair of holes complemental to and receiving said pins whereby to anchor the background member against angular shifting relative to the selected spindle on which the circle scale is centered; an indicator arm fixed on the outer end portion of the selected spindle for rotation therewith; said arm extending radially from the spindle and shaped as a segment of the circle circumscribed by the perimeter of the circle scale and being in photographic contrast relative to the background member.

2. In combination with the apparatus of claim 1, a camera employed to photograph said indicator arm in motion relative to the scale on the background member.

3. A camera shutter speed testing apparatus comprising in combination, a frame, a shaded pole electric motor mounted thereon, a monitor gear wheel mounted for rotation in said frame, a gear train in the frame operatively connecting the motor and the monitor gear wheel at a ratio such that within the motor speed range the monitor gear wheel will revolve at an r.p.m. that can be timed by an ordinary watch, said gear train including a plurality of selective work performance shafts rotatable in unison by the gear train when in operation, each said shaft having fixed thereon an individual operating gear wheel constituting a part of the gear train, each said individual operating gear wheel having a ratio to the monitor gear wheel that is different from the ratio of any other individual operating gear wheel, a fixed point of reference on the exterior of the frame, and a visual indicator movable by and in unison with said monitor gear wheel to pass said point of reference in cycles, said gear train work performance shafts being in parallel spaced relation, said monitor gear wheel having fixed operating attachment to a shaft rotatable in the frame in parallel spaced relation relative to said gear train work performance shafts, said visual indicator being fixedly attached externally of the frame to the monitor gear wheel shaft for rotation therewith, said selective work performance shafts extending laterally outward from the frame, a photographic flat background member disposed externally of the frame over the outer portions of said shafts, said background member having on its outer face a circular scale in photographic contrast to the background member, said scale centered on the axis of a selected one of said shafts, an indicator arm attached to the outer end of said selected shaft for rotation therewith relative to said scale, said indicator arm being in photographic contrast to said background member adjacent said scale, and cooperative means on the frame and the background member for anchoring the latter against angular shifting relative to the frame.

4. In combination with the apparatus of claim 3, a camera employed to photograph said indicator arm in motion relative to the scale on the background member.

References Cited
UNITED STATES PATENTS

| | | | |
|---|---|---|---|
| 351,108 | 10/1886 | Higgins | 88—14 |
| 3,085,846 | 4/1963 | Richard | 73—5 X |

OTHER REFERENCES

Photo Technique, August 1940, pp. 70, 71 and 72.

LOUIS R. PRINCE, *Primary Examiner.*

S. C. SWISHER, *Assistant Examiner.*